US009229707B2

(12) United States Patent
Borissov et al.

(10) Patent No.: US 9,229,707 B2
(45) Date of Patent: Jan. 5, 2016

(54) ZERO DOWNTIME MECHANISM FOR SOFTWARE UPGRADE OF A DISTRIBUTED COMPUTER SYSTEM

(75) Inventors: Lazar Borissov, Sofia (BG); Thomas Brodkorb, Wiesloch (DE); Volker Driesen, Walldorf (DE); Anton Georgiev, Montana (BG); Ivan Mihalev, Sofia (BG); Dencho Mitev, Sofia (BG)

(73) Assignee: SAP SE, Walldorf (DE)

( * ) Notice: Subject to any disclaimer, the term of this patent is extended or adjusted under 35 U.S.C. 154(b) by 1881 days.

(21) Appl. No.: 12/337,675

(22) Filed: Dec. 18, 2008

(65) Prior Publication Data

US 2010/0162226 A1 Jun. 24, 2010

(51) Int. Cl.
*G06F 9/44* (2006.01)
*G06F 9/445* (2006.01)

(52) U.S. Cl.
CPC .. *G06F 8/67* (2013.01); *G06F 8/65* (2013.01); *G06F 8/68* (2013.01)

(58) Field of Classification Search
CPC ............... G06F 9/44; G06F 8/65; G06F 8/67; G06F 8/68
USPC ........... 717/173, 168, 170, 171.173, 175, 176
See application file for complete search history.

(56) References Cited

U.S. PATENT DOCUMENTS

| | | | | |
|---|---|---|---|---|
| 6,360,363 | B1 * | 3/2002 | Moser et al. | 717/170 |
| 7,000,228 | B2 * | 2/2006 | Mortazavi | 717/168 |
| 7,000,229 | B2 * | 2/2006 | Gere | 717/169 |
| 7,260,818 | B1 * | 8/2007 | Iterum et al. | 717/170 |
| 7,818,736 | B2 * | 10/2010 | Appavoo et al. | 717/168 |
| 2003/0172145 | A1 * | 9/2003 | Nguyen | 709/223 |
| 2003/0233648 | A1 | 12/2003 | Earl et al. | |
| 2004/0107416 | A1 * | 6/2004 | Buban et al. | 717/170 |
| 2005/0120346 | A1 * | 6/2005 | Sprigg | 717/176 |
| 2005/0267951 | A1 * | 12/2005 | Joshi et al. | 709/220 |
| 2008/0005724 | A1 * | 1/2008 | Barraclough et al. | 717/138 |
| 2008/0098046 | A1 * | 4/2008 | Alpern et al. | 707/203 |
| 2008/0276234 | A1 * | 11/2008 | Taylor et al. | 717/177 |

* cited by examiner

*Primary Examiner* — Ted T Vo
*Assistant Examiner* — Mohammed Huda

(57) ABSTRACT

In a distributed computer system with cluster architecture, a number of service requests are redirected from a first instance of the cluster to a second instance of the cluster for execution. A software patch is applied to one or more software components running on an application server node of the first instance of the cluster. A number of service requests are redirected from the second instance of the cluster to the first instance of the cluster for execution. The software patch is applied on the one or more software components running on an application server node of the second instance of the cluster. A number of new service requests are directed to the upgraded second instance of the cluster for processing.

17 Claims, 10 Drawing Sheets

ZERO DOWNTIME MECHANISM FOR SOFTWARE UPGRADE OF A DISTRIBUTED COMPUTER SYSTEM

FIELD OF INVENTION

The field of the invention relates generally to electronic data processing and distributed computer systems. More specifically, a system and a method are described for applying software upgrades to a distributed computer system with no downtime.

BACKGROUND OF THE INVENTION

Distributed computer systems typically include a number of separate hardware and software nodes connected by a network. Each separate node runs software to process various operations as required by the users of the system. Usually, a number of nodes of a distributed computer system execute user requests in parallel. Such architecture gives several advantages of the distributed computer systems over the standalone computer systems. One of the advantages is continuity of operations or resilience. If one of the nodes fails, the user requests are handled by the rest of the nodes of the distributed computer system. Another advantage is scalability. The number of nodes of a distributed computer system could be easily increased or decreased as required by the operative load of the system in different periods.

The resilience and scalability of distributed computer systems makes them very popular for providing various enterprise services. Distributed computer systems are also applied for running mission critical business applications. In recent years, enterprise services and all online computer services in general have become an area of high competition. Accordingly, the requirements for the operability of the computer systems are very strong especially with respect to continuity of operations.

Distributed computer systems, as any other computer system, exit operational mode in the periods for installing or applying software upgrades. During its lifecycle, a distributed computer system is regularly upgraded for multiple reasons, e.g. found bugs, inefficient processing, statutory changes, etc. The downtime that is caused by the installation of software harms user satisfaction, especially for mission critical enterprise applications. On the other hand, prolonging the periods between software upgrades could raise issues with the functionality of a mission critical system.

The increasing complexity of the computer systems require shorter periods between upgrades. On the other hand, the competition and the growing user demands require minimizing downtime periods. However, there is still no robust and universal solution that allows installation of software upgrades on distributed systems with no downtime.

SUMMARY OF THE INVENTION

A system and a method for installing software upgrades in a distributed computer system with no downtime are described. In a distributed computer system with cluster architecture, a number of service requests are redirected from a first instance of the cluster to a second instance of the cluster for execution. An execution in progress of a service request is also redirected from the first instance of the cluster to the second instance of the cluster. The execution in progress proceeds from a state that is saved on a public store by the first instance of the cluster. A software patch is applied to one or more software components running on application server nodes of the first instance of the cluster.

A number of service requests are redirected from the second instance of the cluster to the first instance of the cluster for execution. An execution in progress of a service request is also redirected from the second instance of the cluster to the upgraded first instance of the cluster. The execution in progress proceeds from a state that is saved on the public store by the second instance of the cluster. The software patch is applied on the one or more software components running on an application server node of the second instance of the cluster. A number of new service requests are directed to the upgraded second instance of the cluster for processing.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Distributed computer system architecture typically includes a number of separate server nodes running a similar set of software components to execute various user service requests. In this document, the term "software component" means software code, executed on an application server. In this document, the term service request means a way by which a user accesses an application running on a distributed computer system. With service requests, the user induces the application to perform an action, e.g., to provide an enterprise service, to process input data, to send back output date, etc. In this document, a service request may represent a set of service requests from a single user.

The separate server nodes usually communicate with each other by means of a computer network. An example for such distributed computer system architecture is computer cluster. There are different types of computer cluster layouts. Generally, computer cluster includes a number of application servers with similar or identical configuration working in parallel in several cluster instances. The incoming user service requests are distributed between the application servers in accordance with predefined rules, e.g., load balancing, user sessions, etc.

In order to build a computer cluster, appropriate hardware and software are required. From software perspective, the hardware components in a cluster have to run operating system that enable clustering. Examples of such operating systems are Windows Server family developed by Microsoft Corp., and the open software Linux server OS. On a higher level, the system platforms that are used for developing and running the necessary computer applications have to support clustering as well.

The system platforms utilize the capabilities of the operating systems to build cluster execution environment for the computer applications. An example for such a system platform is Java Enterprise Edition (Java EE) system platform. Java EE is the name for a bundle of related programs for developing and running application programs written in the Java™ programming language. It was initially presented by Sun Microsystems Inc. The platform is not specific to any one processor or operating system. Java EE specification had become a publically recognized standard under which various vendors provide proprietary solutions for building application servers and clusters, respectively.

Figure 1:
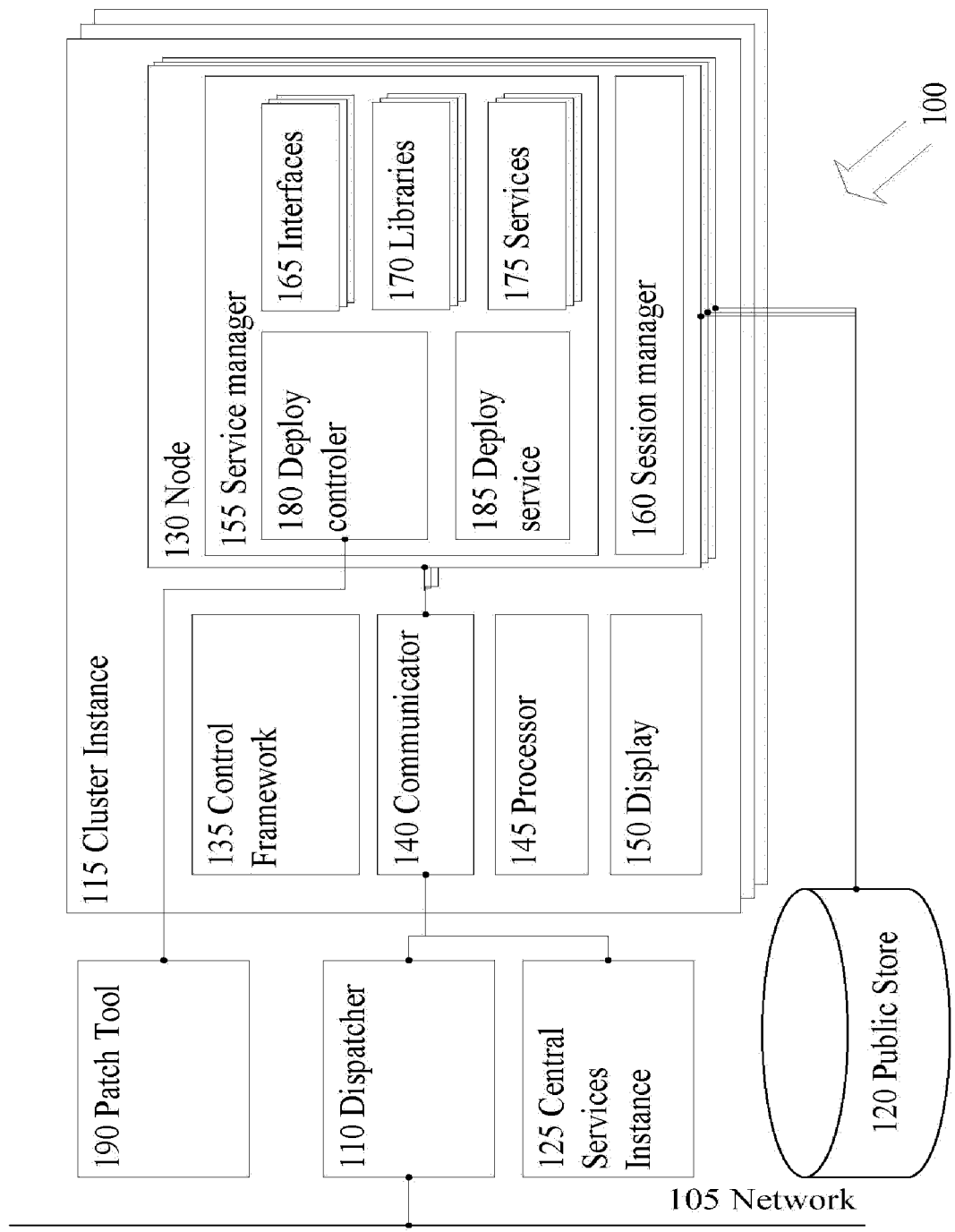
FIG. 1 illustrates a block diagram of a system in which a zero downtime mechanism for a software upgrade of a distributed computer system is applied, according to one embodiment of the invention.

FIG. 1 is block diagram of system 100 in which a zero downtime mechanism for a software upgrade of a distributed computer system is applied. According to one embodiment of the invention, system 100 is built compliant with Java EE platform specification. For example, system 100 may be built upon SAP NetWeaver™ Java application server (AS) system platform. System 100 processes user requests for various enterprise services provided by a plurality of software applications. The software applications run in system 100. User requests are received via network 105 at dispatcher 110. Dispatcher 110 is module acting between the web clients of the users and the application servers that execute the user service requests.

System 100 further includes a plurality of cluster instances 115. In FIG. 1, only one of cluster instances 115 is illustrated in detail. All cluster instances 115 represent a single hardware and each of them has similar structure. There are at least two cluster instances 115 in a cluster. Dispatcher 110 forwards the user requests to an appropriate cluster instance 115. Cluster instances 115 store common data in public store 120. For example, the binary data of a running enterprise software application is stored in public store 120. The binary data provides program code and related information, necessary for execution of the application. In this document, public store 120 means a store that is shared among all application servers of cluster instances 115.

Central services instance 125 is an instance or a module in system 100 that handles the communication and synchronization between cluster instances 110. Central services instance 125 is responsible for lock administration of shared resources, message exchange, and load balancing within the cluster. With the help of central services instance 125, a software application can lock and release shared resources and objects. Central services instance 125 may maintain a table to store lock requests and lock statuses.

Each cluster instance runs at least one application server (AS), illustrated with node 130. In another embodiment of the invention, cluster instance 115 is AS, and nodes 130 are different server processes, e.g., Java virtual machines (JVMs). Each cluster instance 115 further includes control framework 135. One of the main purposes of control framework 135 is to start, stop, and monitor the performance of the modules of cluster instance 115.

Communicator 140 is another module of the cluster instance 115 which handles the incoming service requests. Communicator 140 forwards the requests to available nodes 130 for processing. Central services instance 125 may provide information to communicator 140 about the availability of application server nodes 130. In an embodiment of the invention, communicator 140 reads service requests from a stack or a queue. Then, communicator 140 decides which node 130 is available to handle the request, and sends the requests accordingly. Alternatively, when one of nodes 130 has sufficient resources to consume a request, it may take the request, process it, and write a result back into communicator 140 to be returned to the originator of the request through dispatcher 110.

Cluster instance 115 further includes processor 145 and display module 150. Processor 145 executes all computer instructions of cluster instance 115 as required by different modules. Display 150 renders user interface for monitoring and administrating cluster instance 115 by a user with sufficient privileges.

In one embodiment of the invention, each node 130 is a Java EE compliant application server (AS). The AS includes components on three logical levels. On the lowest level are included low level sub systems that provide functions such as class loading, cluster communication, persistent configuration data management, etc. On the next level are included components that provide various runtime functionality and application programming interfaces (APIs). Such components are services, libraries, and interfaces. Third level encompasses the applications that are deployed on the AS.

Service manager 155 and session manager 160 are low level components from the lowest level of AS. Service manager 155 is responsible for the lifecycle of AS components on the middle level. Service manager 155 acts as a container of a number of interfaces 165, libraries 170, and services 175. Interfaces 165 libraries 170 and services 175 ensure running environment for processing user service requests. Deploy controller 180 and deploy service 185 are special services responsible for software installations, upgrades, and de-installations. The necessary software changes are communicated by patch tool 190 to deploy controller 180 through a deploy controller API. From there, the changes to third level software components, e.g., applications, are applied by deploy service 185. The changes to second level components, e.g., interfaces 165, libraries 170, and services 175, are applied by service manager 155.

Session manager 160 controls user sessions in node 130. Session manager 160 also enables session failover safety mechanism. Sessions are used to keep the state of a user accessing an application within one or more service requests. An active user session is a session which is currently bound with a request that is processed by node 130, while an inactive user session is currently not bound with a request. User sessions may be stored inside memory space of node 130. User session may also be stored in public store 120 region which is not damaged if node 130 stops unexpectedly, e.g., for applying a software upgrade. Thus, the user sessions stored in public store 120 remain unaffected, and they can be mapped to another node and even to another cluster instance. Thus, if an execution of a request is in progress on a server node 130, and the sever node 130 fails or stops, the execution of the request may proceed on another node 130 of another cluster instance 115 from the state, stored in the corresponding user session on public store 120 by session manager 160.

Figure 2:
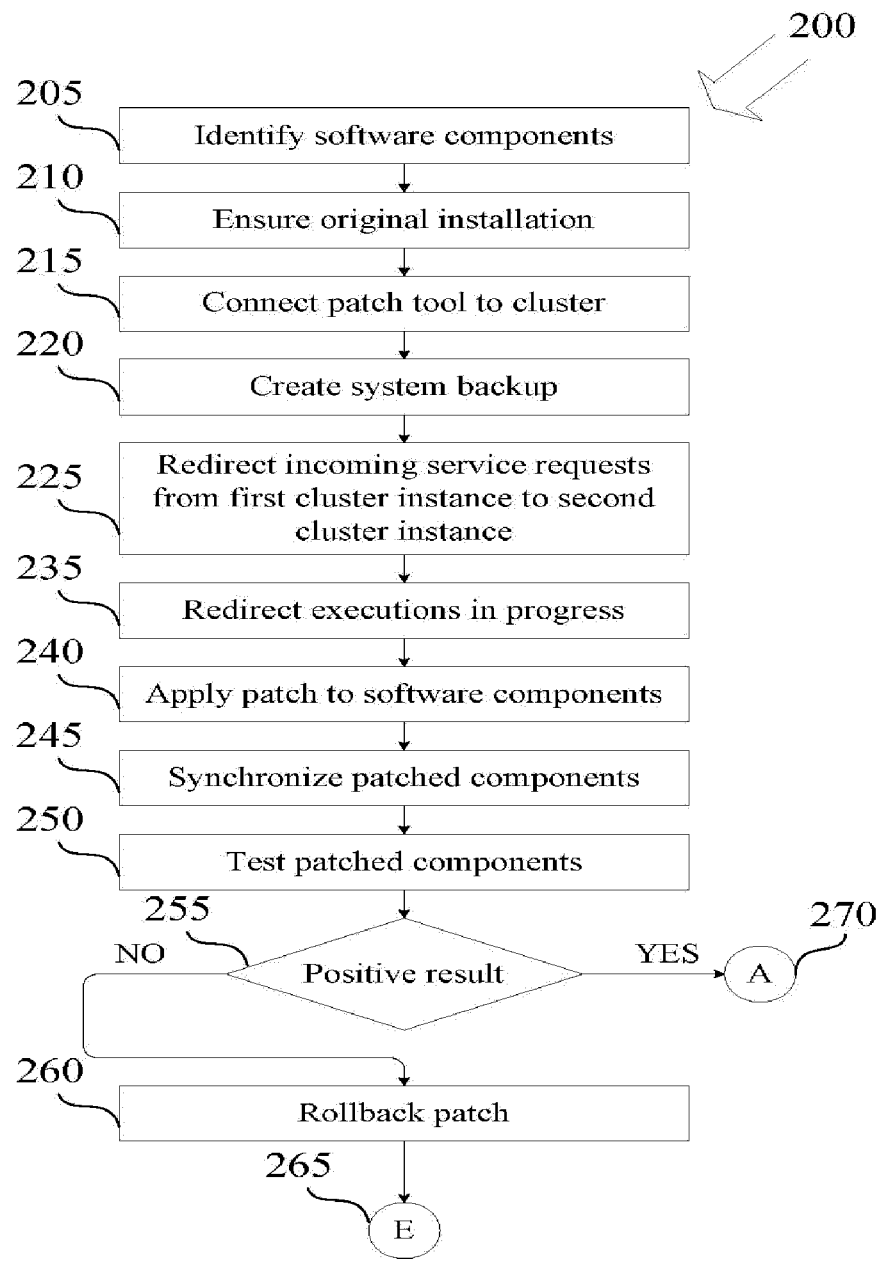
FIG. 2 illustrates a flow chart of a first part of a process for software upgrade of a distributed computer system with zero downtime, according to one embodiment of the invention.

FIG. 2 is flow chart 200 of a first part of a process for software upgrade of a distributed computer system with zero downtime. The distributed system that is upgraded during this process may have architecture similar to the architecture of system 100, according to one embodiment of the invention. At block 205, a software patch that has to be installed on the distributed system is analyzed. This is done in order to identify those software components among the software components installed on the distributed system that will be upgraded with the patch. The software patch may upgrade software components on all levels, e.g., system interfaces, libraries and services, and software application components.

At block 210, an original installation of the identified software components is ensured. In this document the term original installation means an installation of the version of the software components that is running before the upgrade. The original installation is required in a case the upgrade is unsuccessful and the software components have to be rolled-back to their version before upgrade. At block 220, an additional precaution measure is taken by making a backup of a cluster instance before the upgrade. The backup may be performed by a separate patch tool, connected to the distributed system at block 215.

Once all precaution measures are taken, at block 225, the implementation of patch upgrade starts with redirecting the incoming service requests from one of the instances to another cluster instance for execution. The distributed system, or the cluster, could have an unlimited number of instances. For the purposes of this document, it is sufficient to illustrate the invention with a distributed computer system that has two instances, first and second. It is obvious for one of ordinary skill in the art to see that the same approach could be applied for upgrading distributed systems with more than two active instances.

When the incoming requests are redirected, on the first instance of the cluster may be executed one or more previously received service requests. For such executions in progress, instead of failing the corresponding requests, a failover mechanism is triggered to continue the executions on another instance. At block 235, the executions in progress are redirected to the second instance of the cluster. As it was explained earlier in paragraph [0031] with respect to FIG. 1, user sessions with the states of the executions is in progress are stored in a public store area. The module responsible for dispatching the requests between cluster instances assigns the requests which execution is in progress to another active instance of the cluster, e.g., to the second instance. The second instance of the cluster reads the state of the execution from the public store and proceeds from there.

At block 240, a patch tool applies the software patch to the application server of the first instance of the cluster. More specifically, the patch tool may use the standard deployment mechanism of application servers running in the first instance. The upgrades or patches to the identified software components are applied to binary data of the components in the public store at block 240. In an embodiment of the invention, the patch may be applied to a separate copy of the binary data of the software components in the public store, e.g., a different database schema. Alternatively, the changes could be applied directly the stored binary data of the components. The changes of the binary data stored in the public store do not interfere with the previous version of the binary data stored in the local file systems of the application server nodes of the cluster. At block 245, the binary data of the in the local file systems of all application server nodes of the first instance are synchronized with the patched binary data in the public store.

At block 250, the upgraded instance of the cluster is tested. In order to perform the test, a number of test requests may be routed to the upgraded instance. The test requests may be sent from a specific user or from a specific location. The dispatch module of the cluster or the communicator module of the first instance, depending on the cluster configuration, could recognize such requests and submit them for execution by the upgraded instance. The result of the executed test requests is examined at block 255. In case of negative result, the applied software upgrade or patch is rolled-back at block 260. At block 265, the upgrade process ends unsuccessfully. If the result is positive, the process continues at block 270.

Figure 3:
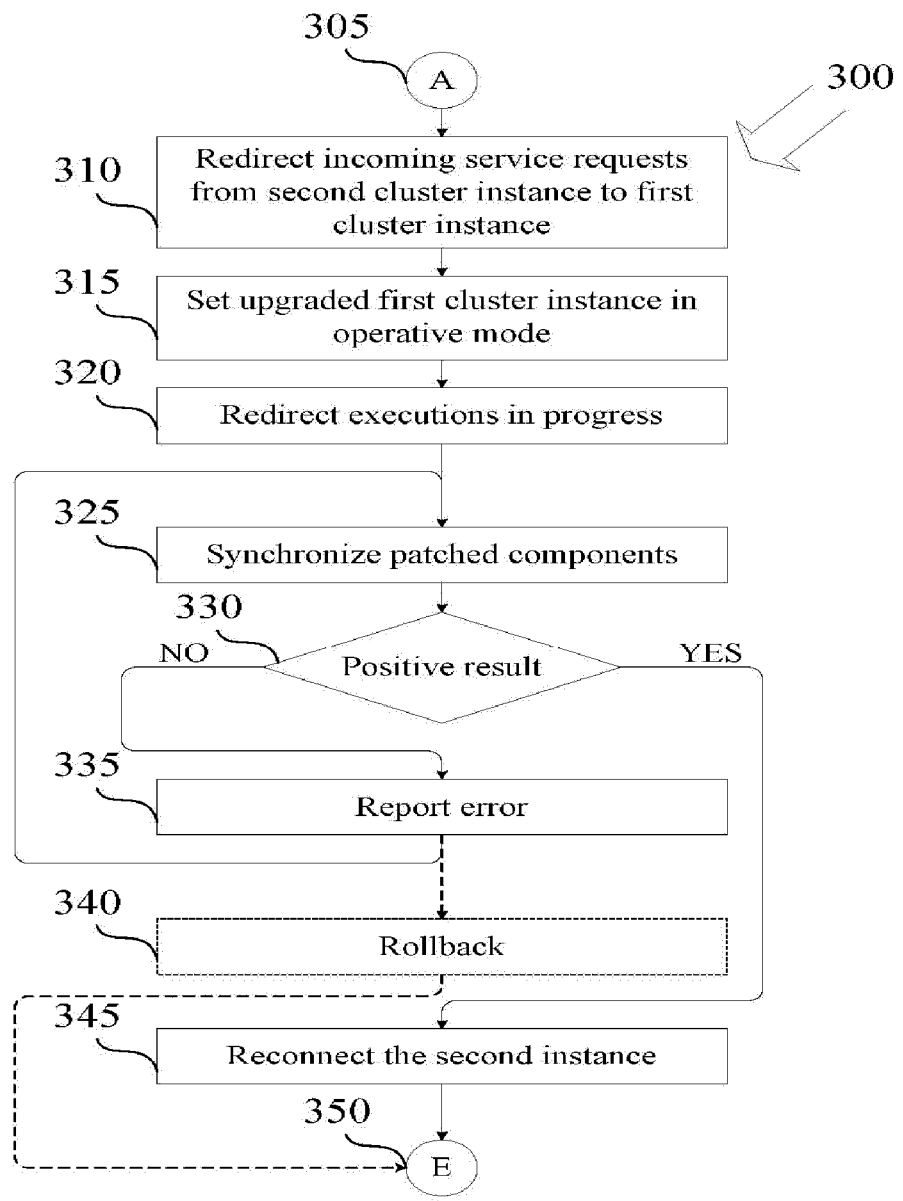
FIG. 3 illustrates a flow chart of a second part of a process for software upgrade of a distributed computer system with zero downtime, according to one embodiment of the invention.

FIG. 3 is flow chart 300 of a second part of the process for software upgrade of a distributed computer system with zero downtime, according to one embodiment of the invention. The upgrade process from FIG. 2 continues at block 305. At block 310, the incoming service requests are redirected from the second instance of the cluster to the upgraded first instance of the cluster. At the same time, at block 315, the upgraded first instance is set back to operative mode.

In one embodiment of the invention, it is possible the upgraded first instance of the cluster to be set in productive mode before redirecting the service requests from the second instance of the cluster. In this case, the two instances of the cluster may work in parallel, running different versions of the upgraded software components. Such parallel running requires compatibility between the versions of the upgraded software. The compatibility requirements include backward and forward compatible data exchange channels (e.g., protocols) between the instances and the structure of the exchanged data (e.g., messages) using these channels. The original and the patched versions of the software components will run and exchange data between the different instances within the cluster. Compatibility requirements may also be effected by the structure of the messages that are exchanged between the instances of the cluster and a central resource or control module. Further, the compatibility requirements may be effected by the structure of a shared database, where software components store data. Such compatibility requirements could make an upgrade far more complex than necessary.

When the two instances are not allowed to work in parallel with different versions of the upgraded software components, the compatibility requirements may be far less restrictive. In this case, compatibility requirements would mainly concern the synchronization of the user sessions stored in the public store. The upgraded cluster instance should be able to read the state of the requests, which execution is in progress, and to continue their execution at block 320. Regardless whether the two instances operate in parallel with different versions of the upgraded software components, the distributed system continues operations without downtime.

At block 325, the binary data in the local file systems of all application server nodes of the second instance are synchronized with the patched binary data stored in the public store for the patched software components. At block 330, a feedback from the synchronization is examined. In a case of negative result, an error is reported to patch tool, the reasons for failure are analyzed, and the upgrade of the second instance continues at block 325. Alternatively, the whole cluster upgrade could be rolled-back at block 340 and the process ends at block 350, as illustrated with the dotted line in FIG. 3. The decision for a rollback may be automatic or may depend from a system administrator.

If the examination of the feedback at block 335 shows positive result, the service requests are executed correctly and the upgraded instance is reconnected to the cluster at block 345. With this the rolling patch is accomplished with zero downtime, and the upgrade process ends at block 350.

Figure 4:
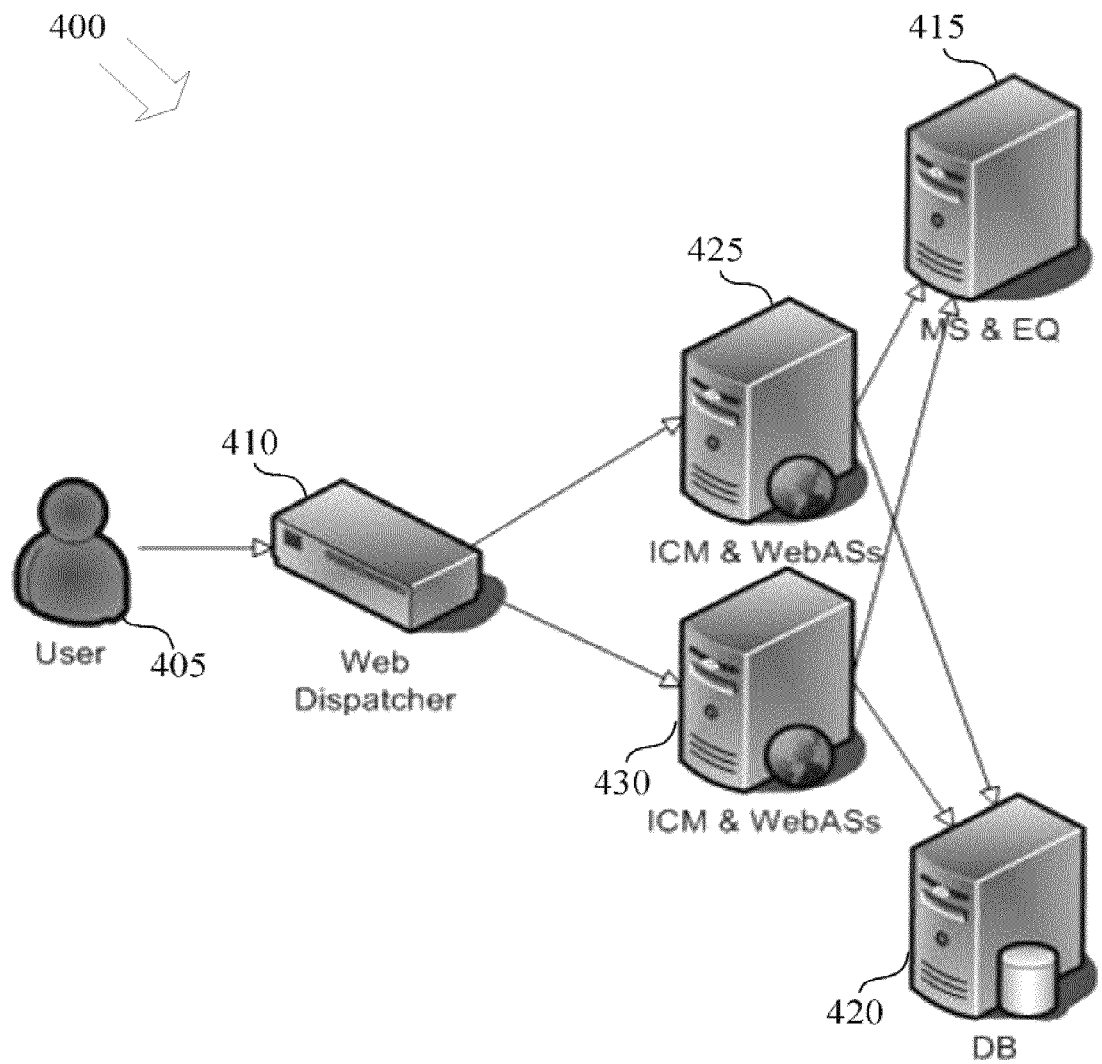
FIG. 4 illustrates a block diagram of a distributed computer system, according to one embodiment of the invention.

FIG. 4 is a block diagram of a simplified distributed computer system 400 for processing service request initiated by user 405. According to one embodiment of the invention, distributed computer system 400 is built using Java EE specification compliant SAP NetWeaver Java AS platform technology. Service requests are received at web dispatcher 410. Module 415 represents a central services instance, including message service (MS) for system data exchange within system 400, and SAP enqueue service (EQ) for managing logical locks when the clustered processes of system 400 access shared resources. Such shared resources are stored in module 420, which contain a shared database (DB).

Distributed system 400 includes two cluster instances illustrated with modules 425 and 430. In each cluster instance, a communicator or Internet communication manager (ICM) module, and a plurality of application servers, also called Web application servers (WebASs), run. ICM module receives or gets the requests from web dispatcher 410 and forwards them to an appropriate WebAS, depending on overall load. Another criteria for routing a user request to a specific WebAS is the distribution of active user sessions. When a set of user requests are processed in stateful mode, they have to be routed to the same WebAS.

FIG. 5 through 10 are block diagrams that represent the same distributed computer system that is illustrated in FIG. 4 as system 400. FIGS. 5 through 10 illustrate the configuration of this distributed system during a process of zero downtime software upgrade.

Figure 5:
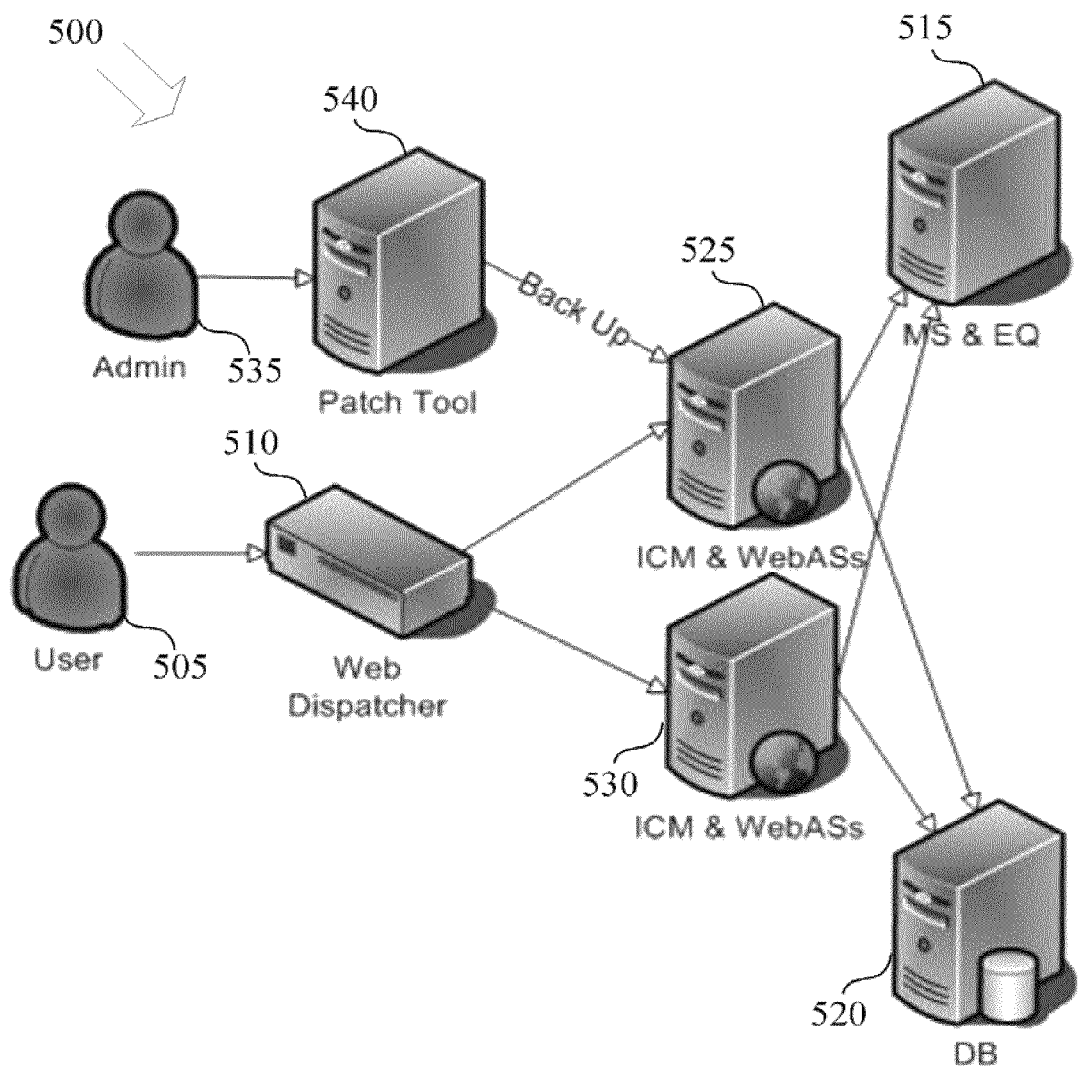
FIG. 5 illustrates a block diagram of a distributed computer system during preparation for zero downtime software upgrade, according to one embodiment of the invention.

In FIG. 5, in distributed system 500, in addition to the standard modules, patch tool module 540 is added. Patch tool 540 is connected to cluster instance 525 that will be upgraded first. The actions that patch tool 540 performs during the software upgrade are initiated and managed by administrator 535. Alternatively, the software upgrade may be organized in a manner that does not require initiating the tasks by administrator 535. As patch tool 540 may be used Java Support Package Manager (JSPM) tool. When connected to cluster instance 525, patch tool 540 makes back-up copy of the cluster configuration and data, directed by administrator 535, as illustrated in FIG. 5.

In one embodiment of the invention, patch tool 540 is used to identify the software components that have to be upgraded and that are applicable for the rolling patch upgrade approach. Patch tool 540 may also be used for various user notifications regarding the patching process. Another important function that patch tool 540 provides is checking the number of active instances of the distributed computer system. Rolling patch approach with zero downtime is possible only when there are at least two active cluster instances. Patch tool 540 should have access to the original installations of the software components involved in the upgrade. When an upgrade of a cluster instance fails, patch tool 540 rolls back the patching.

Figure 6:
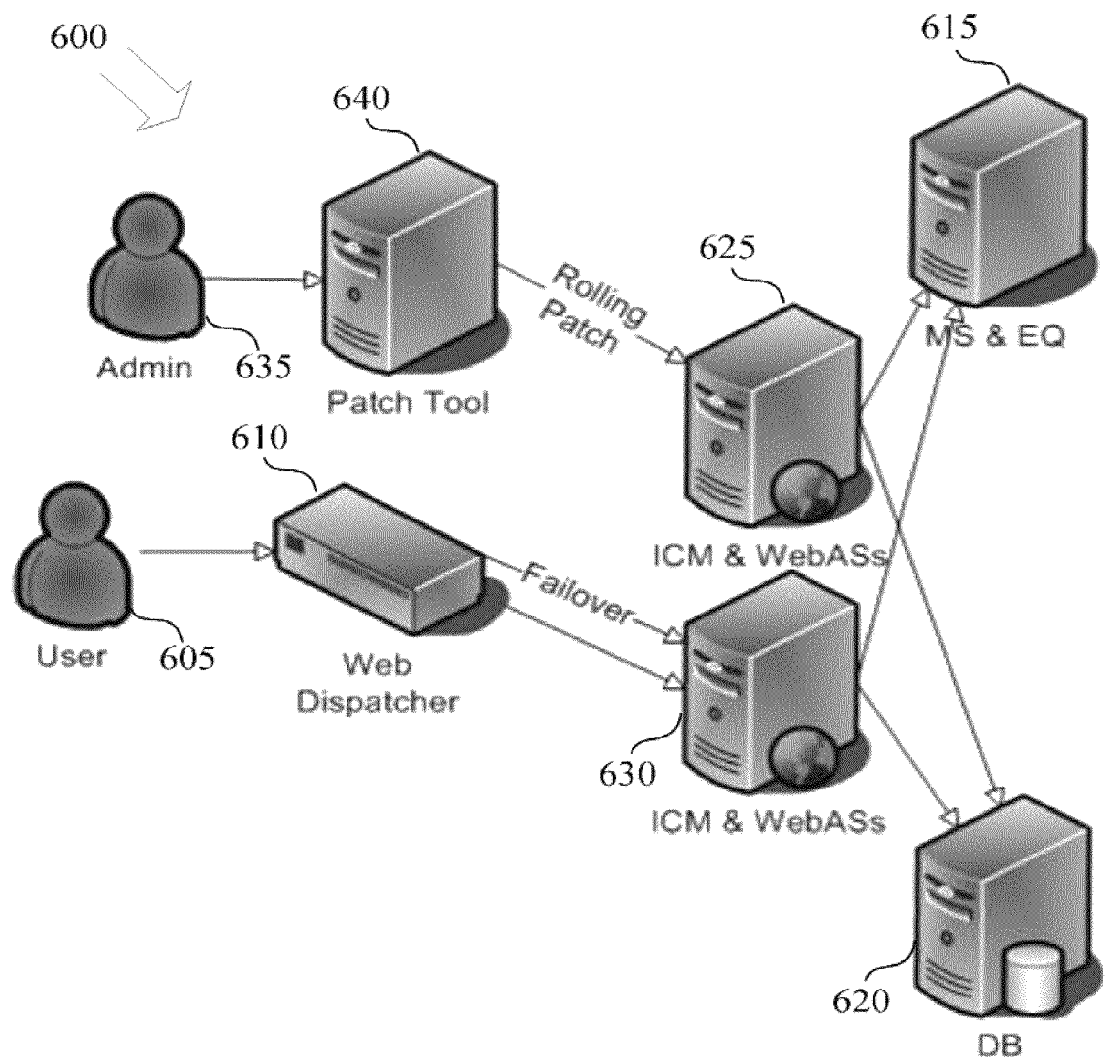
FIG. 6 illustrates a block diagram of a distributed computer system during zero downtime software upgrade of a first instance of a cluster, according to one embodiment of the invention.

FIG. 6 is a block diagram of distributed computer system 600, which is the same distributed system, illustrated in FIGS. 4 through 10, during the software upgrade process. In FIG. 6, cluster instance 625 is disconnected from web dispatcher 610. Control frameworks of cluster instances of distributed computer system 600, and more precisely, their startup framework, should support rolling mode for installing software upgrades to the application servers of the instances. Startup framework should prevent an unauthorized start of the instance during the rolling patch process. Patch tool 640 may access control framework of instance 625 in order to ensure these requirements.

The ICM of cluster instance 625 should be able to redirect all productive user service requests from instance 625 to instance 630, which is the other active instance of distributed system 600. As illustrated on FIG. 6, ICM redirects the service requests which execution was not finalized at instance 600 before entering rollback upgrade mode. In other words, ICM failovers the service requests that are in process. The execution of those service requests continues on cluster instance 630.

Cluster instance 630 reads the state of the requests in process from the corresponding sessions that are persisted on public store 620. Therefore, the running WebASs of cluster sessions have to enable and support data based session management without restarting. Also, rolling upgrade with zero downtime requires configuration of cluster sessions that allows a new WebAS node to be started in already running instance without reading its configuration data from public store 620.

Patch tool 640 accesses the deploy controller of one of application servers in instance 625 through the corresponding deploy controller API. Through deploy controller, patch tool 640 sets the rolling deploy mode and initiates the software upgrades of the involved software components. When a system software component is upgraded, (e.g., a library, a service, or an interface) the deploy controller delivers the patch to the service manager of the current WebAS. The service manager provides a running environment for all system components of the application server, including the deploy controller. Server manager handles the upgrade of the system component in shared database 620 and synchronizes the running component with the changed binary data.

When an application software component is upgraded, the deploy controller delivers the patch to deploy service. The deploy service is the standard instrument for installing and activating application software components in a SAP NetWeaver Java application server, or WebAS as illustrated in FIG. 6. Both, deploy controller and deploy service are services that run in each WebAS in cluster instances 625 and 630. The deploy service is responsible for the upgrade of the application component in shared database 620 and for the synchronization of the running component with changed binary data.

Figure 7:
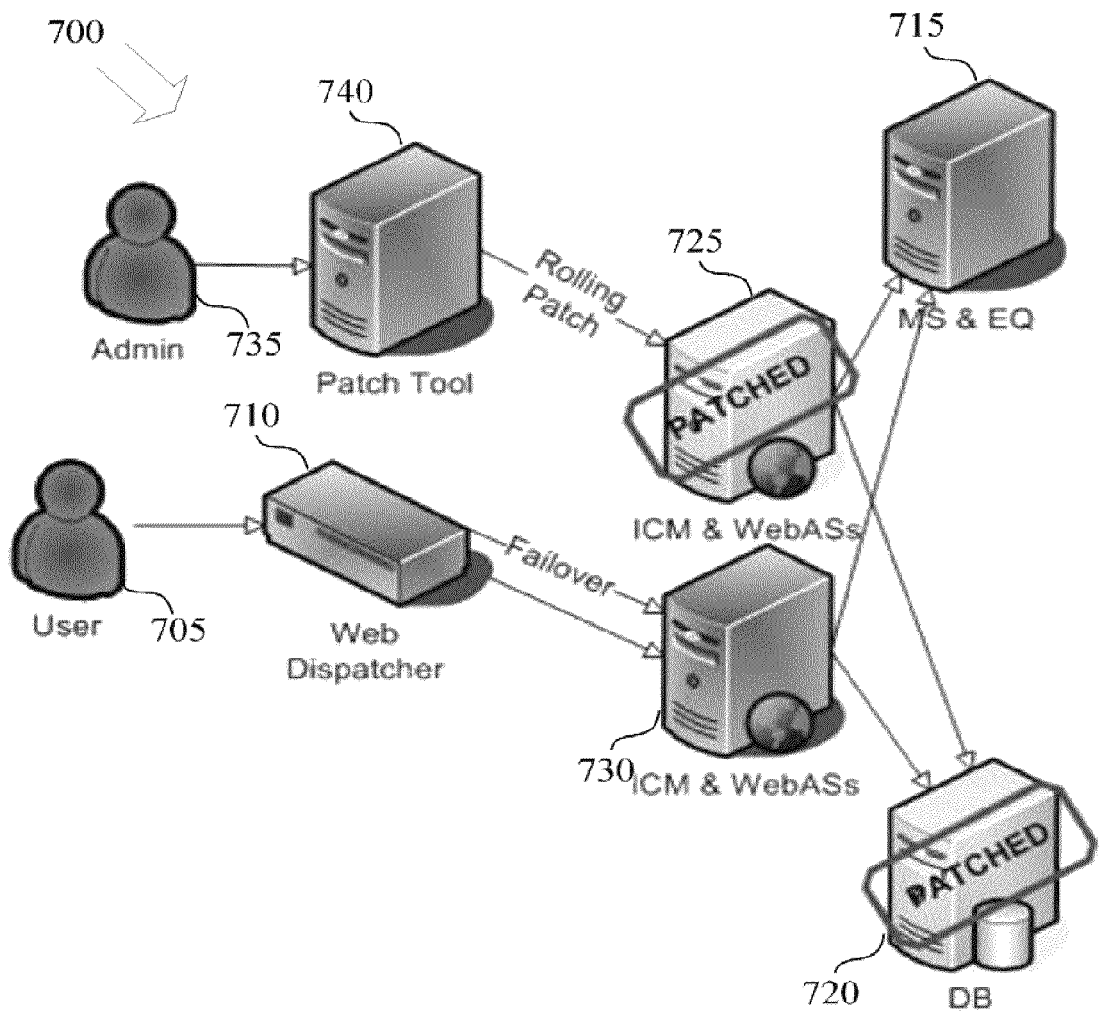
FIG. 7 illustrates a block diagram of a distributed computer system during approval of a software upgrade of a first instance of a cluster, according to one embodiment of the invention.

FIG. 7 is a block diagram of distributed computer system 700, which is the same distributed computer system, illustrated in FIGS. 4 through 10, in different stages of the rolling software upgrade process. In FIG. 7, system 700 is in stage where the involved software components are patched in shared database 720 and synchronized in all WebASs in instance 725. In order to approve the upgrade, patch tool 740 may pause patch process for instance 725 through deploy controller. Instance 725 is set in test mode and ICM module route a number of test service requests. The purpose is to check whether upgraded software components function correctly, e.g., the upgrades are applied correctly to the source code stored in database 720 and synchronized in all application servers in instance 725.

Patch tool 740 checks test results and approves or rejects the upgrade. If not approved, the patch is rolled-back. Patch tool 740 could perform the check automatically, or this could be managed by administrator 735. After the patch is approved, the upgrade process is resumed through deploy controller. ICM continues to redirect service requests to the active cluster instance 730.

Figure 8:
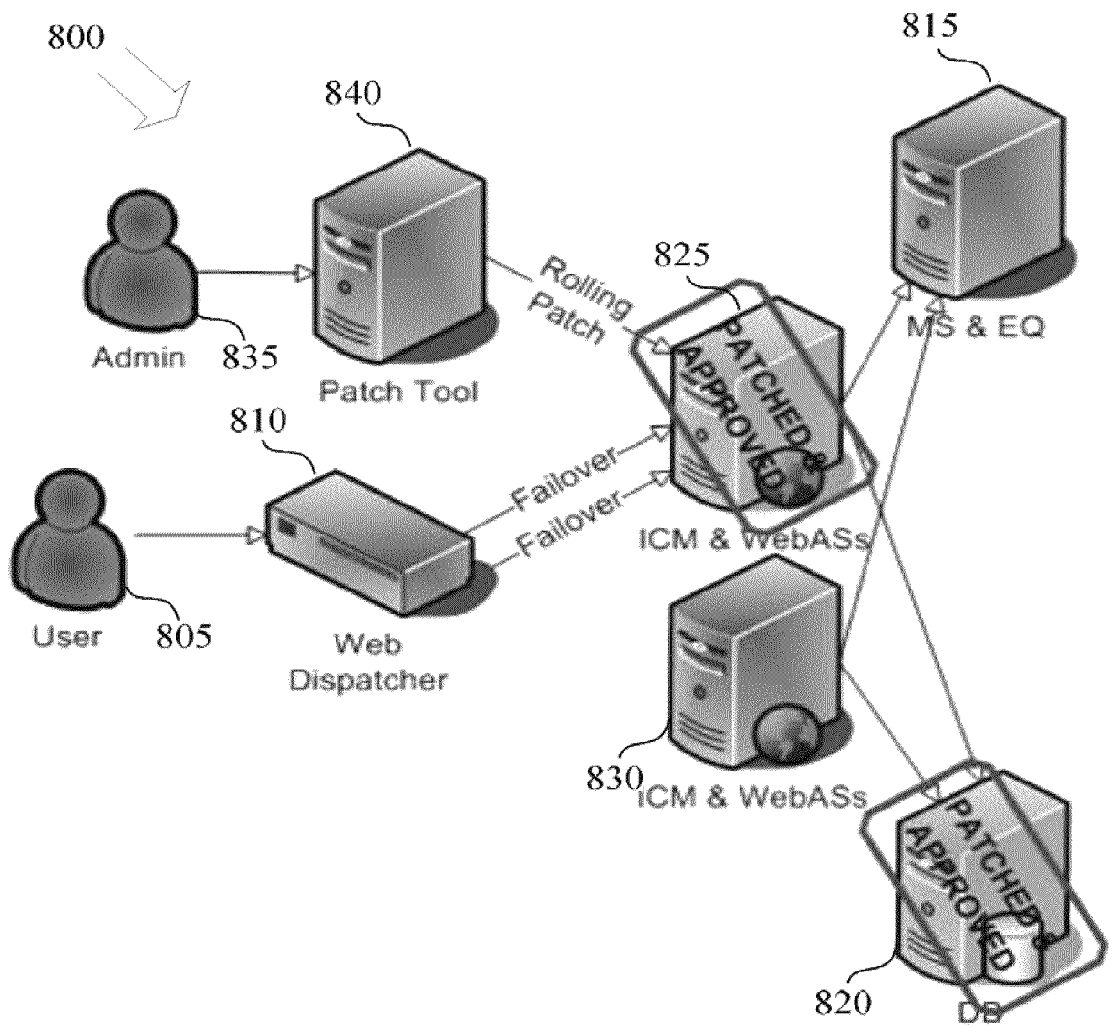
FIG. 8 illustrates a block diagram of a distributed computer system during zero downtime software upgrade of a second instance of a cluster, according to one embodiment of the invention.

FIG. 8 is a block diagram of distributed computer system 800, which is the same distributed computer system, illustrated in FIGS. 4 through 10, in different stages of the rolling software upgrade process. In FIG. 8, the second cluster instance 830 is disconnected from the productive load of incoming services requests. The patched instance 825 is reconnected to the load. The execution of all services requests in process on instance 830 are transferred to instance 825. The rolling patch must provide compatibility between the different versions of the upgrade software components in order to enable the failover of these requests. From user perspective, system 800 continues its operational mode without interruption or downtime.

In one embodiment of the invention, instance 825 is reconnected before disconnecting instance 830. In such a case, both instances work in parallel and execute different versions of the software components that are upgraded. In order to enable such parallel work of different versions of the software components, additional compatibility requirements are addressed. For example, data structures where the components persist their states or related application data have to be compatible or if data is exchanged, it has to be reformatted accordingly.

Patch tool 840 ensures synchronization of the software components running on WebASs of instance 830 with the upgraded binary data in shared database 820. Patch tool 840 performs this task through the deploy controllers, the deploy services and the service managers of the application servers. The upgrade of instance 830 may be checked for correctness by patch tool 840, as described above in reference to FIG. 7. If the testing results are correct, the patch is approved. Otherwise, the upgrade is rolled-back.

Figure 9:
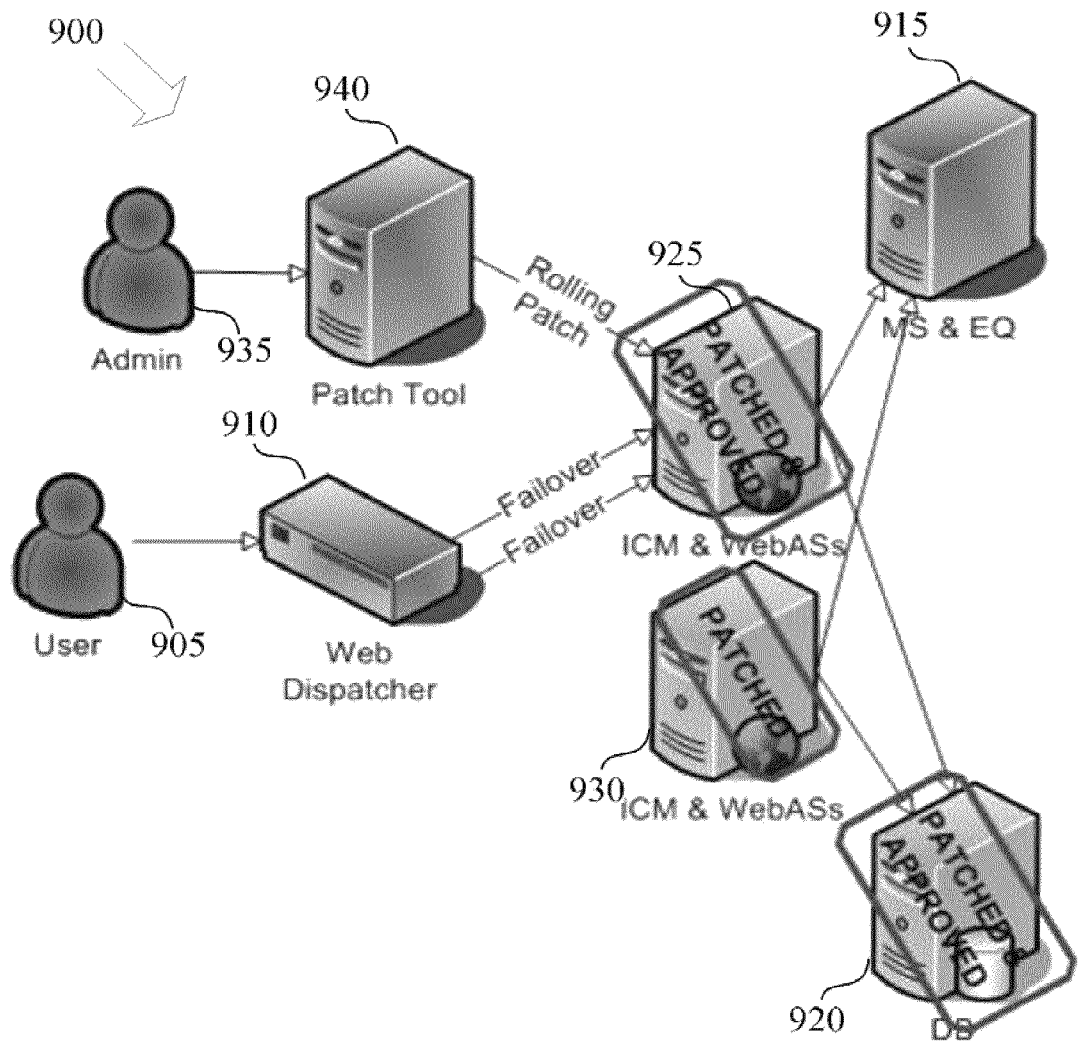
FIG. 9 illustrates a block diagram of a distributed computer system during approval of a software upgrade of a second instance of a cluster, according to one embodiment of the invention.
Figure 10:
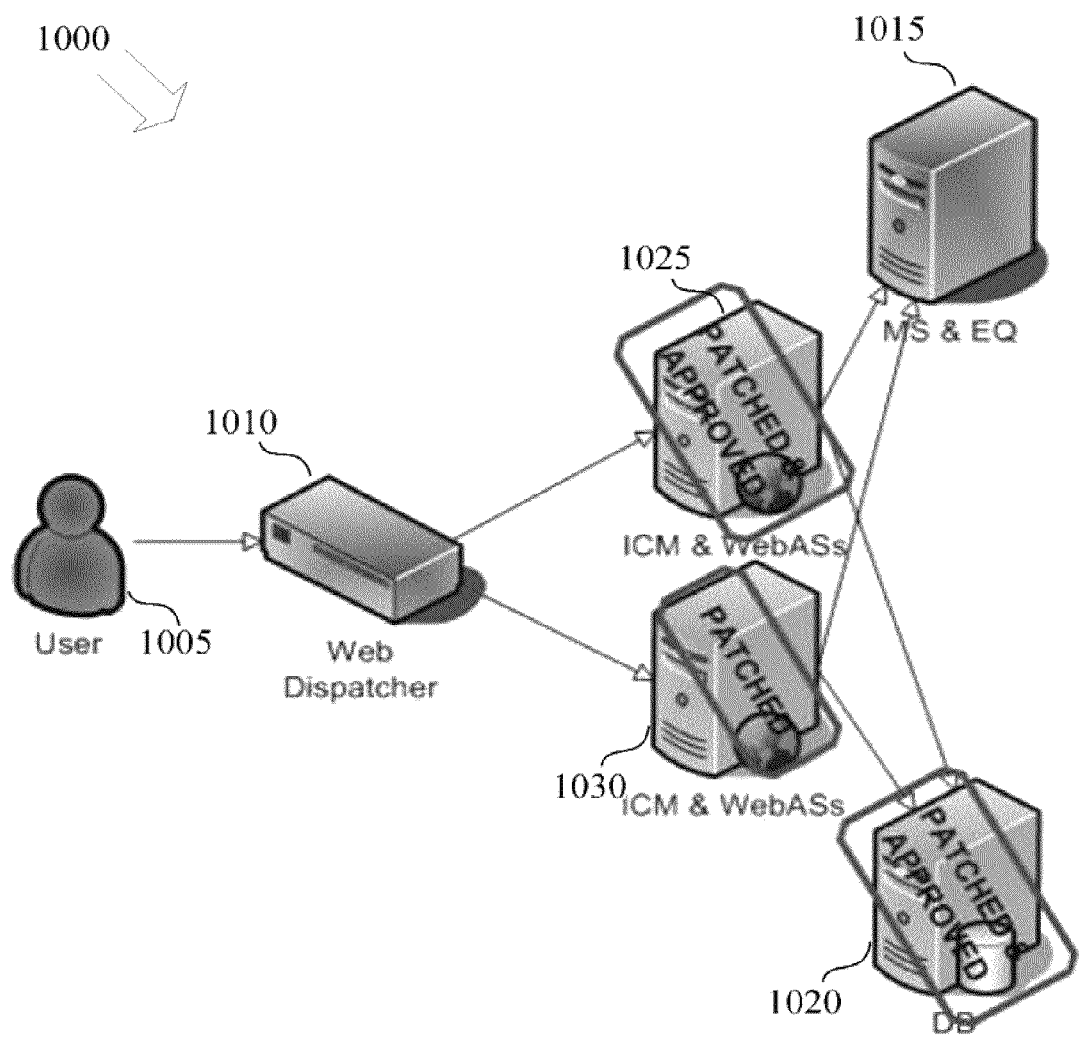
FIG. 10 illustrates a block diagram of a distributed computer system after zero downtime software upgrade of a first and a second instance of a cluster, according to one embodiment of the invention.

FIG. 9 is a block diagram of system 900 in stage where both instances are patched and the patch is approved. FIG. 10 is a block diagram of system 1000, which is the same distributed computer system, illustrated in FIGS. 4 through 9, in different stages of the rolling software upgrade process. In FIG. 10, system 1000 is back to normal operation mode. The upgrade process is successfully completed with zero downtime for user 1005.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computer implemented method for zero downtime software upgrade of a distributed computer system, the method comprising:

receiving a software update for upgrading one or more software components of a plurality of software components running on a plurality of application server nodes of a plurality of instances of a cluster, wherein each instance of the plurality of instances of the cluster runs at least one application server node of the plurality of application server nodes;

redirecting one or more service requests from a first instance of the cluster to a second instance of the cluster for an execution, wherein the one or more service requests are executed by the plurality of software components;

redirecting an execution in progress of a partially executed service request from the first instance of the cluster to the second instance of the cluster, wherein the execution in progress proceeds from a state that is saved on a public store by the first instance of the cluster;

applying the software update to an installation of the one or more software components running on an application server node of the first instance of the cluster, wherein the software update is applied in parallel to the execution of the one or more service requests and with the proceeding execution in progress of the partially executed service request redirected from the first instance to the second instance of the cluster;

redirecting at least one service request from the second instance of the cluster to the upgraded first instance of the cluster for an execution;

redirecting an execution in progress of a partially executed service request from the second instance of the cluster to the upgraded first instance of the cluster, wherein the execution in progress proceeds at the upgraded first instance of the cluster from a state that is saved on the public store by the second instance of the cluster; and applying the software update to an installation of the one or more software components running on an application server node of the second instance of the cluster, wherein the software update is applied in parallel to the execution of the at least one service request and with the proceeded execution in progress of the partially executed service request redirected from the second instance to the upgraded first instance of the cluster.

2. The method of claim 1, wherein receiving the software update comprises:

in response to receiving the software update, creating a backup copy of the first instance of the cluster comprising the plurality of software components running on the application server node of the first instance of the cluster.

3. The method of claim 1, wherein receiving the software update comprises:

identifying the one or more software components from the plurality of software components running on the plurality of application server nodes of the cluster; and in response to receiving the software update, ensuring a copy of an original installation of the identified one or more software components, the original installation comprises a current version of the one or more software components.

4. The method of claim 1, wherein redirecting the execution in progress of the partially executed service request from the first instance to the second instance of the cluster comprises:

storing a user session to the public store by a session manager of the first instance of the cluster, the user session keeps a current state of the execution in progress of the partially executed service request redirected from the first instance to the second instance of the cluster;

reading the user session from the public store by a session manager of the second instance of the cluster; and proceeding with the execution in progress of the partially executed service request redirected from the first instance of the cluster to the second instance of the cluster on the second cluster instance from the current state of the stored user session.

5. The method of claim 1, wherein applying the software update to the installation of the one or more software components running on the application server node of the first instance of the cluster comprises:

applying one or more software upgrades to binary data of the one or more software components, the binary data is stored in the public store; and synchronizing the installation of the one or more software components running on the application server node of the first instance of the cluster with the upgraded binary data in parallel to the execution of the one or more service requests and with the proceeding execution in progress of the partially executed service request redirected from the first instance to the second instance of the cluster.

6. The method of claim 1, wherein applying the software update to the installation of the one or more software components running on the application server node of the first instance of the cluster comprises:

processing a test service request at the installation of the upgraded one or more software components at the upgraded first instance of the cluster in parallel to the execution of the one or more service requests and with the proceeding execution in progress of the partially executed service request redirected from the first instance to the second instance of the cluster; and approving the software update or rolling back the software update at the upgraded first instance of the cluster, according to the result of the processing of the test service request.

7. The method of claim 5, wherein applying the software update to the installation of the one or more software components running on the application server node of the second instance of the cluster comprises:

synchronizing the installation of the one or more software components running on the application server node of the second instance of the cluster with the upgraded binary data in parallel to the execution of the at least one service request and with the proceeding execution in progress of the partially executed service request redirected from the second instance to the upgraded first instance.

8. An article of manufacture comprising a non-transitory computer readable storage medium having computer readable instructions stored thereon for execution by a processor to perform a method, the method comprising:

preparing a software patch for upgrading one or more software components of a plurality of software components running on a plurality of application server nodes of a plurality of instances of a cluster, wherein each instance of the plurality of instances of the cluster runs at least one application server node of the plurality of application server nodes;

redirecting one or more service requests from a first instance of the cluster to a second instance of the cluster for an execution, wherein the plurality of service requests are executed by the plurality of software components;

redirecting an execution in progress of a partially executed service request from the first instance of the cluster to the second instance of the cluster, wherein the execution in progress proceeds from a state that is saved on a public store by the first instance of the cluster; and applying the software patch to an installation of the one or more software components running on an application server node of the first instance of the cluster, wherein the software patch is applied in parallel to the execution of the one or more service requests and with the proceeding execution in progress of the partially executed service request redirected from the first instance to the second instance of the cluster;

redirecting at least one service request from the second instance of the cluster to the upgraded first instance of the cluster for an execution;

redirecting an execution in progress of a partially executed service request from the second instance of the cluster to the upgraded first instance of the cluster, wherein the execution in progress redirected from the second instance to the upgraded first instance of the cluster proceeds at the upgraded first instance of the cluster from a state that is saved on the public store by the second instance of the cluster; and applying the software patch to the installation of the one or more software components running on an application server node of the second instance of the cluster, wherein the software patch is applied in parallel to the execution of the at least one service request and with the proceeding execution in progress of the partially executed service request redirected from the second instance to the upgraded first instance of the cluster.

9. The article of manufacture of claim 8, wherein redirecting the execution in progress of the partially executed service request from the first instance to the second instance of the cluster comprises:

storing a user session to the public store by a session manager of the first instance of the cluster, the user session keeps a current state of the execution in progress of the partially executed service request redirected from the first instance to the second instance of the cluster;

reading the user session from the public store by a session manager of the second instance of the cluster; and proceeding with the execution in progress of the partially executed service request redirected from the first instance to the second instance of the cluster on the second cluster instance from the current state of the stored user session.

10. The article of manufacture of claim 8, wherein applying the software patch to the installation of the one or more software components running on the application server node of the first instance of the cluster comprises:

applying one or more software upgrades to binary data of the one or more software components, the binary data is stored in the public store; and synchronizing the installation of the one or more software components running on the application server node of the first instance of the cluster with the upgraded binary data in parallel to the execution of the one or more service requests and with the proceeding execution in progress of the partially executed service request redirected from the first instance to the second instance of the cluster.

11. The article of manufacture of claim 8, wherein applying the software patch to the installation of the one or more software components running on the application server node of the first instance of the cluster comprises:

routing a test service request from the redirected one or more service requests to the upgraded first instance of the cluster;

processing the test service request at the installation of the upgraded one or more software components at the upgraded first instance of the cluster in parallel to the execution of the one or more service requests and with the proceeding execution in progress of the partially executed service request redirected from the first instance to the second instance of the cluster; and approving the patch or rolling back the patch, according to the result of the processing of the test service request.

12. A computer system providing zero downtime software upgrade of a distributed computer environment, the system comprising a memory to store computer executable instructions available at a first instance of a cluster in the distributed computer environment; and a processor at the first instance of the cluster coupled to the memory and operable to execute the instructions to:

receive an upgrade for at least one software component of a plurality of software components running on a plurality of server nodes of a plurality of instances of the cluster, wherein each instance of the plurality of instances of the cluster runs at least one application server node of the plurality of application server nodes, redirect one or more service requests from a first instance of the cluster to a second instance of the cluster for execution, wherein the one or more service requests are executed by the plurality of software components, redirect an execution in progress of a partially executed service request from the first instance of the cluster to the second instance of the cluster, wherein the execution in progress proceeds from a state that is saved on a public store by the first instance of the cluster, apply the upgrade to an installation of the at least one software component running on an application server node of the first instance of the cluster, wherein the upgrade is applied in parallel with the execution of the one or more service requests and the proceeded execution in progress of the partially executed service request redirected from the first instance to the second instance of the cluster, redirect at least one service request from the second instance of the cluster to the upgraded first instance of the cluster for execution, redirect an execution in progress of a partially executed service request from the second instance of the cluster to the upgraded first instance of the cluster, wherein the execution in progress proceeds at the upgraded first instance of the cluster from a state that is saved on the public store by the second instance of the cluster, and apply the upgrade to an installation of the at least one software component running on an application server node of the second instance of the cluster, wherein the upgrade is applied in parallel with the execution of the at least one service request and the proceeded execution in progress of the partially executed service request redirected from the second instance to the upgraded first instance of the cluster.

13. The system of claim 12, wherein the memory comprises further instructions executed by the processor to:

in response to receiving the upgrade for the at least one software component of the plurality of software components running at the first instance of the cluster, create a backup copy of the first instance of the cluster comprising the plurality of software components running at the first instance of the cluster.

14. The system of claim 12, wherein the memory comprises further instructions executed by the processor to:

in response to receiving the upgrade for the at least one software component, access an installable current version of the at least one software component.

15. The system of claim 12, wherein applying the upgrade to the at least one software component at the first instance of the cluster comprises:

upgrading binary data of the at least one software component; and synchronizing the at least one software component running at the first instance of the cluster with the upgraded binary data in parallel with the proceeded execution in progress of the partially executed service request redirected from the first instance to the second instance of the cluster.

16. The system of claim 12, wherein applying the upgrade to the at least one software component at the first instance of the cluster comprises:

processing a test service request at the upgraded at least one software component at the first instance of the cluster in parallel with the proceeded execution in progress of the partially executed service request redirected from the first instance to the second instance of the cluster; and approving or rolling back the upgrade of the at least one software component at the first instance of the cluster, according to the result of the processing of the test service request.

17. The system of claim 15, wherein applying the upgrade to the at least one software component at the second instance of the cluster comprises:

synchronizing the at least one software component running at the second instance of the cluster with the upgraded binary data in parallel with the proceeded execution in progress of the partially executed service request redirected from the second instance to the upgraded first instance of the cluster.

* * * * *